(12) United States Patent
Sesti et al.

(10) Patent No.: US 11,603,049 B2
(45) Date of Patent: Mar. 14, 2023

(54) VEHICULAR CAMERA WITH THERMALLY CONDUCTIVE MATERIAL DISPOSED BETWEEN AND CONTACTING STACKED PCBS

(71) Applicant: Magna Electronics Inc., Auburn Hills, MI (US)

(72) Inventors: Matthew C. Sesti, Williamston, MI (US); Robert A. Devota, Durand, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/658,668

(22) Filed: Apr. 11, 2022

(65) Prior Publication Data

US 2022/0234518 A1 Jul. 28, 2022

Related U.S. Application Data

(63) Continuation of application No. 16/946,129, filed on Jun. 8, 2020, now Pat. No. 11,299,108, which is a continuation of application No. 16/459,992, filed on Jul. 2, 2019, now Pat. No. 10,676,041.

(60) Provisional application No. 62/694,493, filed on Jul. 6, 2018.

(51) Int. Cl.
*B60R 1/02* (2006.01)
*B60R 11/04* (2006.01)
*H04N 5/225* (2006.01)

(52) U.S. Cl.
CPC ............... *B60R 11/04* (2013.01); *B60R 1/02* (2013.01); *H04N 5/2252* (2013.01); *H04N 5/2254* (2013.01); *H04N 5/2257* (2013.01); *B60R 2300/10* (2013.01); *B60R 2300/50* (2013.01)

(58) Field of Classification Search
CPC ......... B60R 11/04; B60R 1/02; H04N 5/2252; H04N 5/2254; H04N 5/2257
USPC .......................................................... 348/148
See application file for complete search history.

(56) References Cited

U.S. PATENT DOCUMENTS

| | | |
|---|---|---|
| 4,712,879 A | 12/1987 | Lynam et al. |
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |

(Continued)

*Primary Examiner* — Nguyen T Truong
(74) *Attorney, Agent, or Firm* — Honigman LLP

(57) ABSTRACT

A vehicular camera includes a lens holder, a plurality of printed circuit boards and a housing portion. The individual printed circuit boards are stacked and overlap one another. Circuitry disposed at a first printed circuit board is electrically connected with circuitry disposed at a second printed circuit board via board-to-board electrical connection. The first side of the first printed circuit board is adhesively bonded to the lens holder via cured adhesive. Thermally conductive material is disposed between and is in thermally-conductive contact with the first printed circuit board and the second printed circuit board. A first electrical connector is disposed at the second printed circuit board and electrically connects with a second electrical connector of an electrical connector portion of the housing portion as the housing portion is being joined with the lens holder to encase the plurality of printed circuit boards during assembly of the vehicular camera.

90 Claims, 6 Drawing Sheets

(56) References Cited

U.S. PATENT DOCUMENTS

| | | |
|---|---|---|
| 7,480,149 B2 | 1/2009 | DeWard et al. |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,256,821 B2 | 9/2012 | Lawlor et al. |
| 8,542,451 B2 | 9/2013 | Lu et al. |
| 9,233,641 B2 | 1/2016 | Sesti et al. |
| 9,277,104 B2 | 3/2016 | Sesti et al. |
| 9,609,757 B2 | 3/2017 | Steigerwald |
| 9,896,039 B2 | 2/2018 | Achenbach et al. |
| 9,937,876 B2 | 4/2018 | Bingle et al. |
| 10,214,157 B2 | 2/2019 | Achenbach et al. |
| 10,576,908 B2 | 3/2020 | Achenbach et al. |
| 10,594,982 B2 | 3/2020 | Mleczko et al. |
| 10,676,041 B2 | 6/2020 | Sesti et al. |
| 10,913,401 B2 | 2/2021 | Bingle et al. |
| 10,946,813 B2 | 3/2021 | Achenbach et al. |
| 11,052,834 B2 | 7/2021 | Salomonsson et al. |
| 11,212,453 B2 | 12/2021 | Wang et al. |
| 11,299,108 B2 | 4/2022 | Sesti et al. |
| 2009/0295181 A1 | 12/2009 | Lawlor et al. |
| 2013/0242099 A1 | 9/2013 | Sauer et al. |
| 2014/0160284 A1 | 6/2014 | Achenbach et al. |
| 2014/0226012 A1 | 8/2014 | Achenbach |
| 2014/0373345 A1 | 12/2014 | Steigerwald |
| 2015/0015713 A1 | 1/2015 | Wang et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |
| 2017/0295306 A1 | 10/2017 | Mleczko |
| 2017/0302829 A1 | 10/2017 | Mleczko et al. |
| 2018/0072239 A1 | 3/2018 | Wienecke et al. |

VEHICULAR CAMERA WITH THERMALLY CONDUCTIVE MATERIAL DISPOSED BETWEEN AND CONTACTING STACKED PCBS

CROSS REFERENCE TO RELATED APPLICATIONS

The present application is a continuation of U.S. patent application Ser. No. 16/946,129, filed Jun. 8, 2020, now U.S. Pat. No. 11,299,108, which is a continuation of U.S. patent application Ser. No. 16/459,992, filed Jul. 2, 2019, now U.S. Pat. No. 10,676,041, which claims the filing benefits of U.S. provisional application Ser. No. 62/694,493, filed Jul. 6, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle. The camera includes a lens holder and an imager printed circuit board, with the imager printed circuit board fixed to the lens holder. The camera also includes a rear housing and a connector printed circuit board, with the connector printed circuit board fixed to the rear housing. The imager printed circuit board and the connector printed circuit board are attached or joined together with a pliable material.

Therefore, the vehicular camera uses a compliant or pliable or conformable or malleable or compressible material disposed between the two printed circuit boards of the camera, so that the imager printed circuit board can be attached at the lens holder and the connector printed circuit board can be attached at the rear housing. If those attachments are made first, then when the housing and lens holder are mated together, the pliable material compresses or conforms to accommodate dimension deviations. If the printed circuit boards are joined via the pliable material and then attached at the lens holder and/or housing after joining, the pliable material compresses or conforms to accommodate dimension deviations to ease the assembly process and maintain proper location of the camera components.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
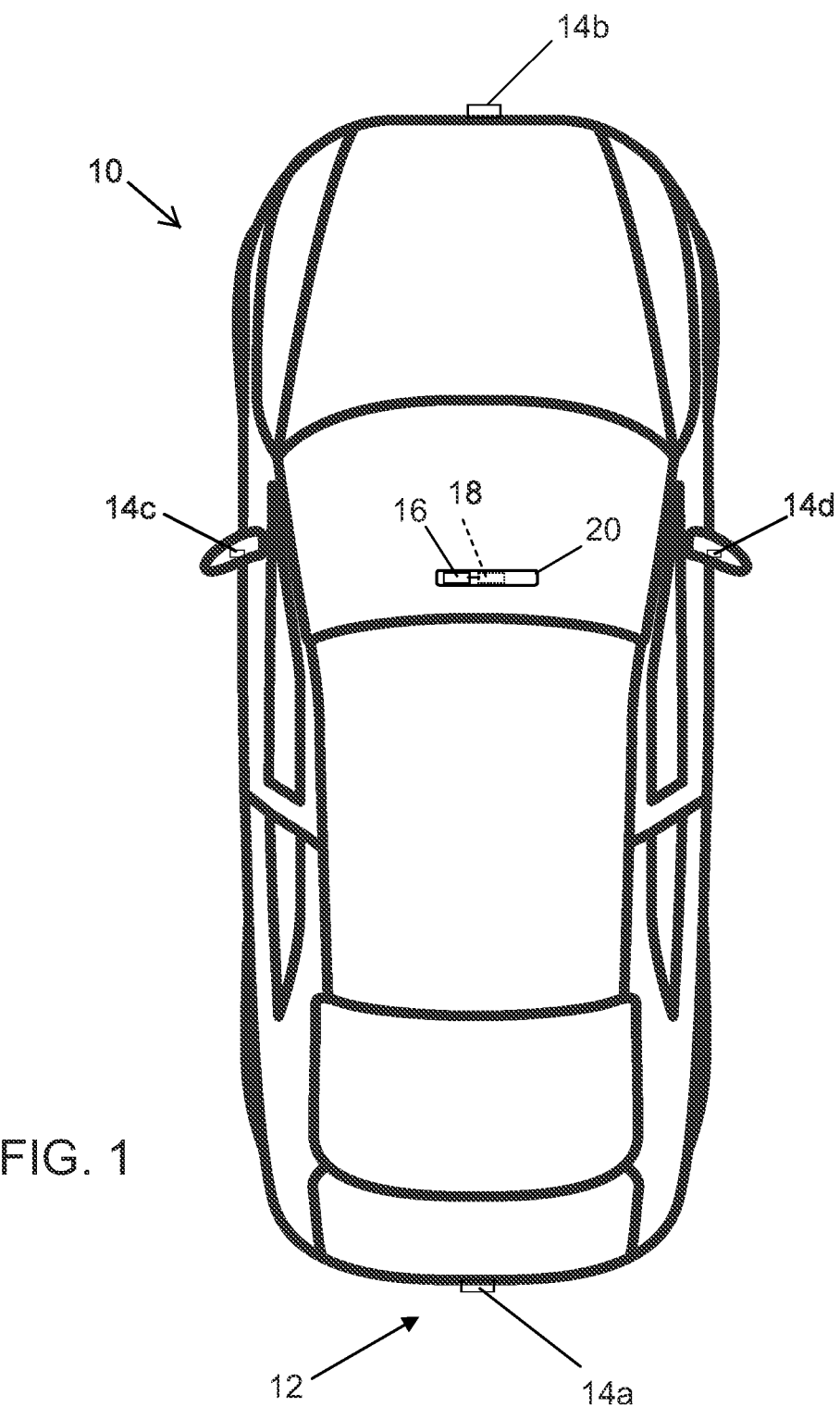
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens (such as a plurality of lens optics at a lens barrel 31 that is accommodated at the lens holder) for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2C:
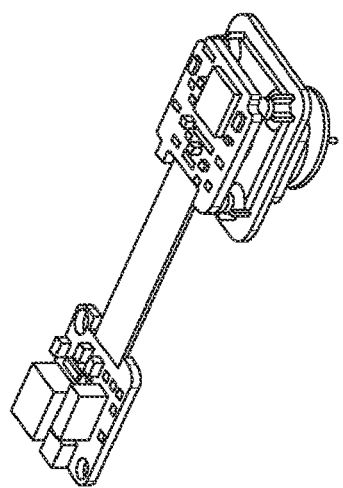
FIGS. 2A-2G are perspective views of printed circuit boards (PCBs) of a camera assembled with a flat build, having a flexible ribbon cable connecting the PCBs.
Figure 2B:
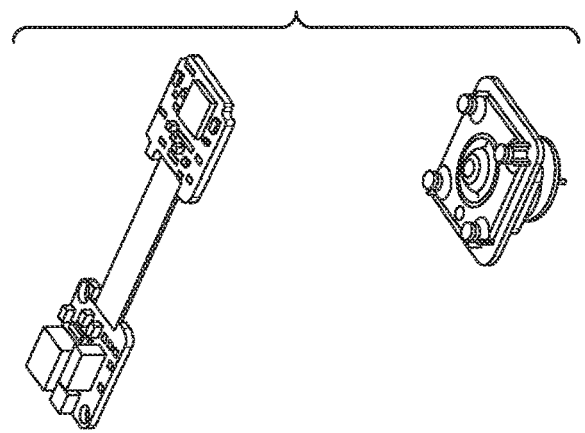
Figure 2A:
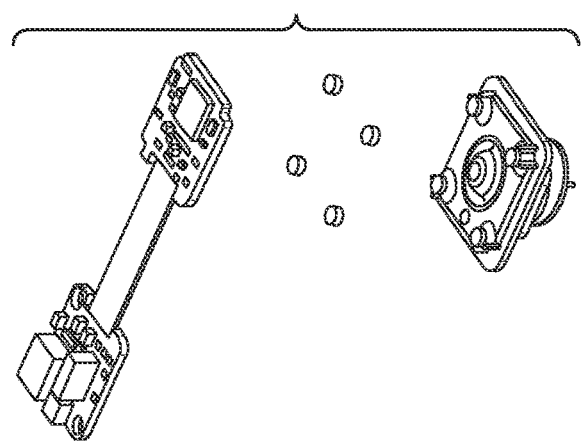
Figure 2E:
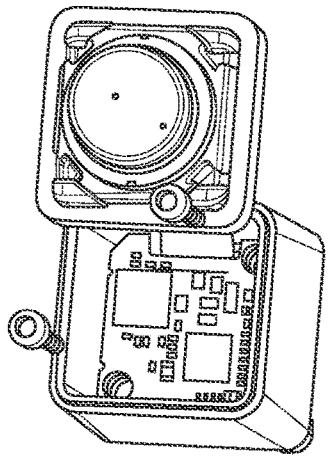
Figure 2G:
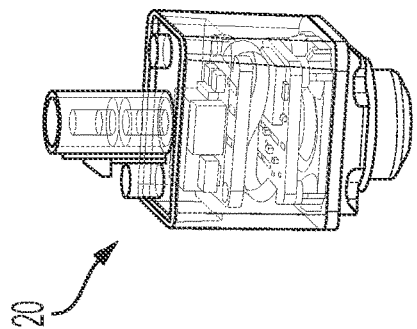
Figure 2D:
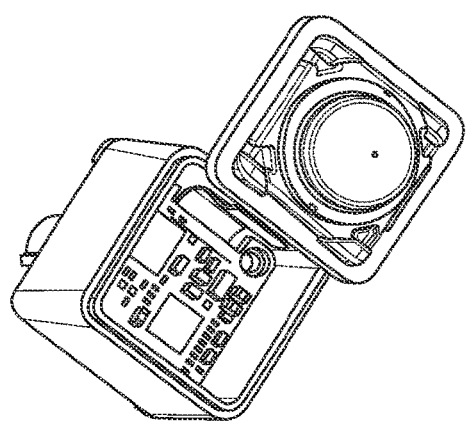
Figure 2F:
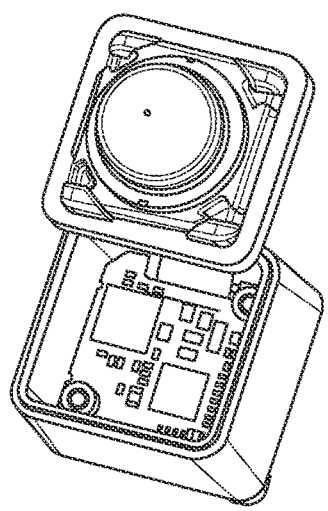

Typically, active focus and alignment is used to set and secure a focal position of a lens to an imager component. However, this leads to expensive and complicated measures to manage the compliance tolerances created by camera components and manufacturing focus/alignment process. Referring now to FIGS. 2A-2G, cameras are typically assembled using flat build construction. FIG. 2A illustrates the exploded view of a typical assembly of an imager printed circuit board (PCB), a connector PCB, a lens holder (including a lens), and mounting hardware. FIG. 2B illustrates the next step of installing the mounting hardware. FIG. 2C demonstrates fixing, focusing, and aligning the lens and imager PCB while simultaneously managing the connector PCB, which is electrically connected to the imager PCB via a flexible ribbon cable (alternatively, the flex cable may be incorporated into the PCB). In FIG. 2D, the connector PCB is installed into a rear cover or housing. In FIG. 2E, screws are used to secure the connector PCB to the rear housing. As shown in FIG. 2F, the rear housing and the lens holder are then assembled together with FIG. 2G illustrating the completed assembly 20.

Figure 3C:
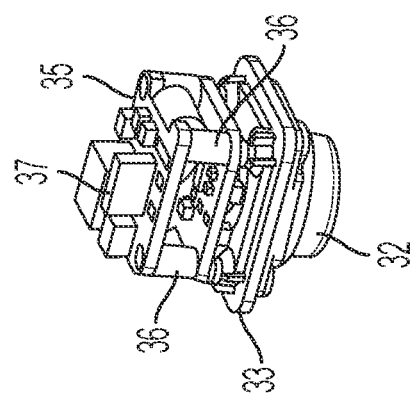
FIGS. 3A-3E are perspective views of other PCBs assembled with pliable connections in accordance with the present invention.
Figure 3B:
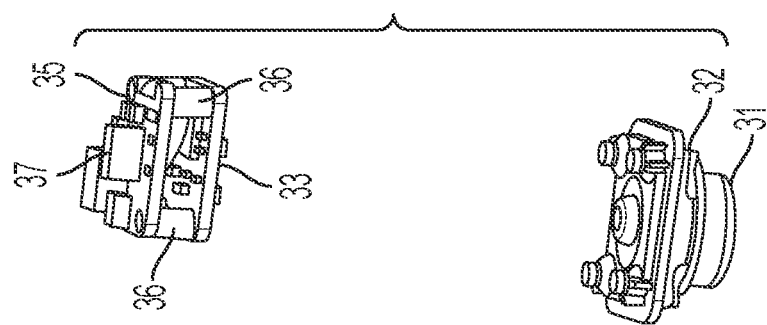
Figure 3A:
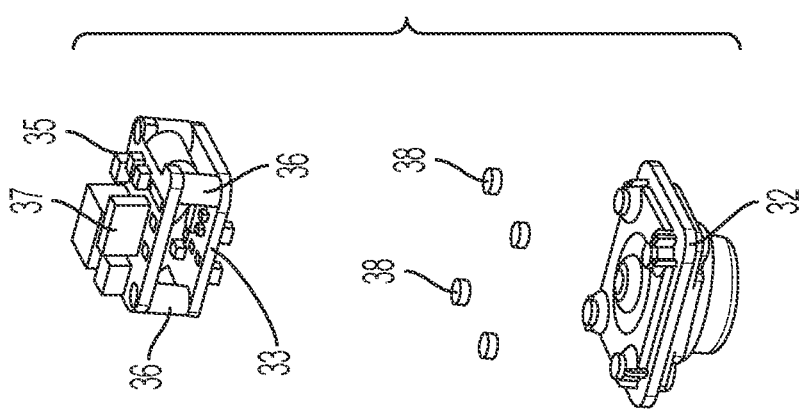

Referring now to FIGS. 3A-3E, the present invention provides an alternative build assembly. FIGS. 3A and 3B illustrate an exploded view of lens cover 32, imager PCB 33, connector PCB 35, pliable material 36, and mounting hardware. The imager PCB 33 and the connector PCB 35 are fixed, attached, stacked or otherwise joined together through the use of pliable material 36. As shown in FIG. 3A, the imager PCB and the connector PCB are joined together via the pliable material (and via an electrical connector, such as a flexible connector or cable or such as a multi-pin connection or the like, that electrically connects circuitry of the imager PCB with circuitry of the connector PCB and that may allow for movement of one of the PCBs relative to the other while maintaining electrical connection between the circuitry of the PCBs) before attaching the imager PCB at the lens holder (such as via adhesive dots 38 or an adhesive bead, such as by utilizing aspects of the cameras and processes described in U.S. Pat. Nos. 9,277,104 and/or 8,542,451, which are hereby incorporated herein by reference in their entireties) and optically aligning and focusing the lens at the imager. Optionally, the lens barrel 31 may be adhesively attached at the lens holder during the process of optically aligning and focusing the lens relative to the imager (after the imager PCB is attached at the lens holder).

Figure 3E:
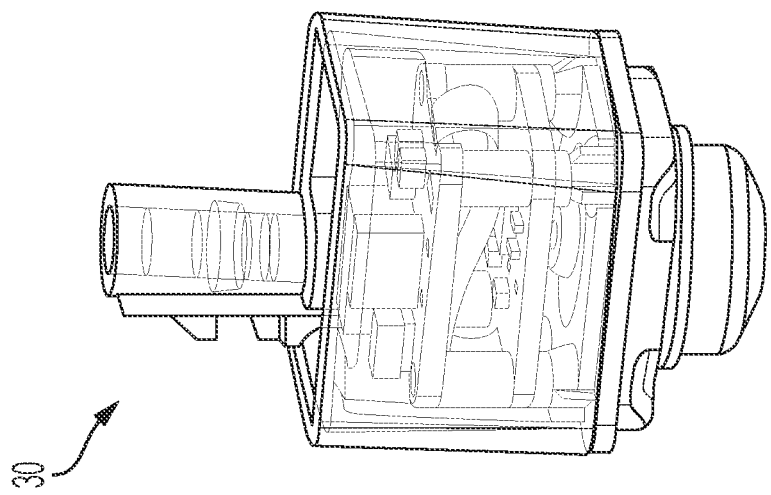
Figure 3D:
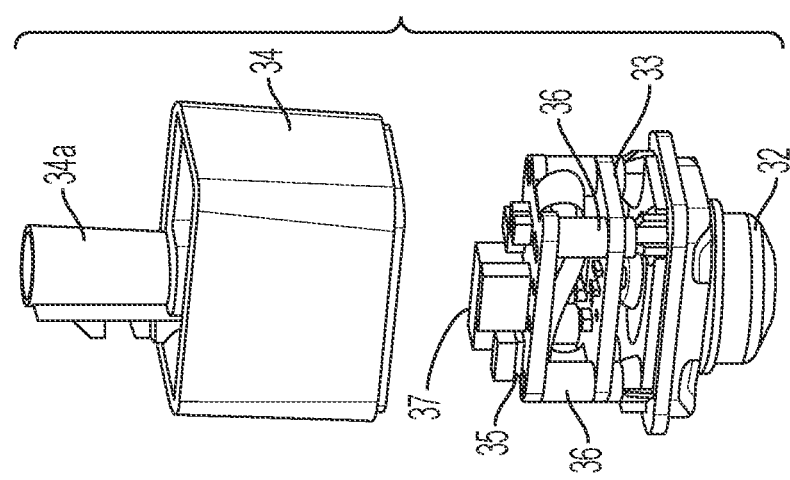
Figure 4B:
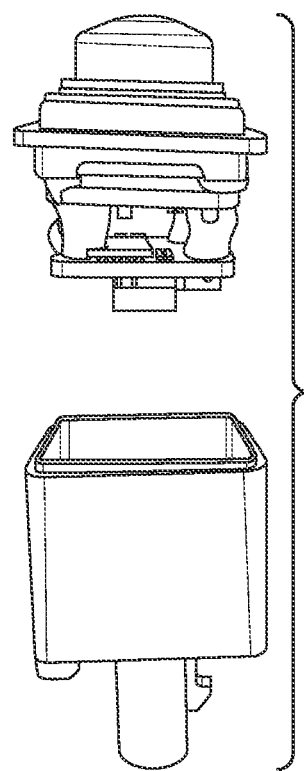
FIGS. 4A and 4B are perspective views of a PCB pliable stack and a pliable sub-assembly respectively in accordance with the present invention.
Figure 4A:
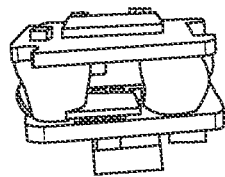

The pliable material 36 that joins the imager PCB 33 and the connector PCB 35 allows for movement between the imager PCB 33 and connector PCB 35 in all directions during the camera assembly process (e.g., compression, expansion, lateral movement, tilting movement, and twisting movement, whereby the connector PCB may move towards or away from the imager PCB and/or may tilt toward one or more side regions and/or may rotate about an axis, such as the optical axis of the lens, relative to the imager PCB). This allows for increasing the fitting tolerances and absorbing and/or compensating for tolerance problems from components and manufacturing optical alignment and focusing processes. In FIG. 3C, the lens holder 32 is mounted to the imager PCB 33 and connector PCB 35 (e.g., via adhesive dots 38 or fasteners). As shown in FIG. 3D, the rear housing 34 is then installed over the imager PCB 33 and connector PCB 35 assembly, where it is mated with and attached to the lens holder or cover 32 to finish camera assembly 30 (FIG. 3E). The connector PCB 35 and/or the image PCB and connector PCB assembly may electrically connect with circuitry within the rear housing to pass electrical signals from the assembly through the housing. Alternatively the rear housing may provide an aperture for a connector portion of the assembly to pass through. FIG. 4A illustrates another view of the imager PCB and the connector PCB fixed, attached, or joined together via the pliable material. As shown in FIG. 4B, the rear housing easily mates to the PCB and lens sub-assembly. The connector PCB 35 may include an electrical connector element 37 that electrically connects to a connector portion 34a (such as a coaxial connector or multi-pin connector) of the rear housing 34 to electrically connect circuitry of the PCBs to the connector element 37, which is configured to electrically connect the camera to a vehicle wire harness when the camera is installed at a vehicle.

Thus, the present invention provides a pliable material disposed between the imager PCB and the connector PCB of a camera, so that the imager PCB can be attached at the lens holder (such as via adhesive or fasteners) and the PCBs may be installed into the rear housing and then, when the housing and lens holder are mated together (to encase the joined imager PCB and connector PCB), the compliant pliable material compresses to accommodate dimension deviations. The pliable material creates a flexible and pliable stack of the two or more PCBs (i.e., more than two PCBs may be stacked in the same manner). The PCBs can then move independently in all directions because the joining material is soft and compliant and can thus absorb or accommodate or compensate for variations in dimensions/tolerances of the components and variations in the manufacturing alignment/focus processes. The material may comprise any suitable soft, pliable, compressible material, such as an elastomeric material or rubber material or the like (e.g., adhesive pad, gel, clips, etc.). This may lead to a reduction in capital expenditures due to less components and relaxed tolerances. Additionally, the present invention allows for increased thermal transfer from PCB to PCB in a two board application. Recurring costs are reduced through reduction or elimination of the flex cable and screws. The reduction of screws reduces PCB "keep-outs" which may reduce overall PCB board sizes or increase component density. Further, the difficult step of installing the connector PCB into the rear housing is eliminated and the "stacked" PCB sub-assembly allows for easier and less complex manufacturing process/tooling.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera comprising:
   a lens holder comprising a lens barrel accommodating a plurality of lens optics;
   a plurality of printed circuit boards, wherein the plurality of printed circuit boards comprises at least a first printed circuit board and a second printed circuit board;
   wherein each printed circuit board of the plurality of printed circuit boards comprises a first side and a second side opposite the first side and separated from the first side by a thickness of the respective printed circuit board;
   wherein the individual printed circuit boards of the plurality of printed circuit boards are stacked and overlap one another;
   a housing portion that is joined with the lens holder to encase the plurality of printed circuit boards;
   wherein circuitry disposed at the first printed circuit board is electrically connected with circuitry disposed at the second printed circuit board via board-to-board electrical connection;
   wherein the circuitry disposed at the first printed circuit board comprises an imaging sensor, and wherein the imaging sensor is disposed at the first side of the first printed circuit board;
   wherein, with the first side of the first printed circuit board and the imaging sensor facing the plurality of lens optics and with the plurality of lens optics aligned with the imaging sensor, the first side of the first printed circuit board is adhesively bonded to the lens holder via cured adhesive;
   wherein thermally conductive material is disposed between the second side of the first printed circuit board and the first side of the second printed circuit board, and wherein the thermally conductive material is in thermally-conductive contact with the second side of the first printed circuit board and is in thermally-conductive contact with the first side of the second printed circuit board;
   wherein a first electrical connector is disposed at the second side of the second printed circuit board; and
   wherein the first electrical connector electrically connects with a second electrical connector of an electrical connector portion of the housing portion as the housing portion is being joined with the lens holder to encase the plurality of printed circuit boards during assembly of the vehicular camera.

2. The vehicular camera of claim 1, wherein the vehicular camera comprises an image processor operable to process image data captured by the imaging sensor.

3. The vehicular camera of claim 2, wherein, with the vehicular camera mounted at a vehicle, the vehicular camera is disposed at a rear portion of the vehicle and views at least rearward of the vehicle, and wherein, responsive at least in part to processing by the image processor of image data captured by the imaging sensor of the vehicular camera, a pedestrian present rearward of the vehicle is detected.

4. The vehicular camera of claim 2, wherein the circuitry disposed at the second printed circuit board comprises the image processor operable to process image data captured by the imaging sensor.

5. The vehicular camera of claim 4, wherein the image processor comprises an image processing chip.

6. The vehicular camera of claim 1, wherein the lens holder comprises a plurality of protrusions.

7. The vehicular camera of claim 6, wherein the cured adhesive comprises a plurality of individual cured adhesive beads, and wherein each individual protrusion of the plurality of protrusions of the lens holder is adhesively bonded to the first side of the first printed circuit board via a respective individual cured adhesive bead.

8. The vehicular camera of claim 6, wherein the cured adhesive comprises four individual cured adhesive beads, and the plurality of protrusions of the lens holder comprises four individual protrusions, and wherein each protrusion of the four individual protrusions of the lens holder is adhesively bonded to the first side of the first printed circuit board via a respective individual cured adhesive bead of the four individual cured adhesive beads.

9. The vehicular camera of claim 1, wherein the cured adhesive is initially curable in an initial curing process that comprises exposure to UV light, and wherein the initially-cured adhesive is further curable to a further cured strength in a secondary curing process after the plurality of lens optics is aligned with the imaging sensor.

10. The vehicular camera of claim 9, wherein, after the initial curing process, the vehicular camera is moved to the secondary curing process, and wherein, when further cured via the secondary curing process, the further-cured adhesive is sufficiently strong to hold the lens barrel relative to the lens holder for use of the vehicular camera in a vehicle.

11. The vehicular camera of claim 9, wherein the cured adhesive comprises a UV-curable/heat-curable adhesive.

12. The vehicular camera of claim 1, wherein the board-to-board electrical connection electrically connecting circuitry disposed at the first printed circuit board with circuitry disposed at the second printed circuit board comprises a flexible ribbon cable.

13. The vehicular camera of claim 1, wherein the board-to-board electrical connection electrically connecting circuitry disposed at the first printed circuit board with circuitry disposed at the second printed circuit board comprises a multi-pin connection.

14. The vehicular camera of claim 1, wherein the thermally conductive material comprises a thermally conductive pad.

15. The vehicular camera of claim 1, wherein the thermally conductive material comprises a thermally conductive gel.

16. The vehicular camera of claim 1, wherein the thermally conductive material allows for movement of the first and second printed circuit boards of the plurality of printed circuit boards as the housing portion is being joined with the lens holder during assembly of the vehicular camera.

17. The vehicular camera of claim 16, wherein the first and second printed circuit boards of the plurality of printed circuit boards are electrically interconnected before the first printed circuit board is adhesively bonded to the lens holder.

18. The vehicular camera of claim 16, wherein the housing portion is joined with the lens holder after the first printed circuit board is adhesively bonded to the lens holder.

19. The vehicular camera of claim 16, wherein movement allowed by the thermally conductive material facilitates alignment of the first electrical connector with the second electrical connector of the electrical connector portion of the housing portion as the housing portion is being joined with the lens holder during assembly of the vehicular camera.

20. The vehicular camera of claim 16, wherein the thermally conductive material comprises a pliable thermally conductive material.

21. The vehicular camera of claim 16, wherein the thermally conductive material comprises a compressible thermally conductive material.

22. The vehicular camera of claim 16, wherein the thermally conductive material comprises an elastomeric thermally conductive material.

23. The vehicular camera of claim 1, wherein the thermally conductive material comprises a pliable thermally conductive material.

24. The vehicular camera of claim 1, wherein the plurality of lens optics is aligned with the imaging sensor after the first and second printed circuit boards of the plurality of printed circuit boards are electrically interconnected.

25. The vehicular camera of claim 1, wherein with the vehicular camera mounted at a vehicle, the electrical connector portion of the housing portion electrically connects to a wire harness of the vehicle.

26. The vehicular camera of claim 25, wherein the electrical connector portion of the housing portion comprises a coaxial connector.

27. The vehicular camera of claim 25, wherein the electrical connector portion of the housing portion comprises a multi-pin connector.

28. The vehicular camera of claim 1, wherein, with the vehicular camera mounted at a vehicle, image data captured by the imaging sensor is communicated via a data communication link to an electronic control unit of the vehicle.

29. The vehicular camera of claim 28, wherein the electronic control unit comprises an image processor for processing image data captured by the imaging sensor.

30. The vehicular camera of claim 1, wherein, with the vehicular camera mounted at a vehicle, the vehicular camera is disposed at an in-cabin side of a windshield of the vehicle and views at least forward of the vehicle through the windshield of the vehicle.

31. The vehicular camera of claim 1, wherein, with the vehicular camera mounted at a vehicle, the vehicular camera is disposed at a rear portion of the vehicle and views at least rearward of the vehicle.

32. A vehicular camera comprising:
a lens holder comprising a lens barrel accommodating a plurality of lens optics;
a plurality of printed circuit boards, wherein the plurality of printed circuit boards comprises at least a first printed circuit board and a second printed circuit board;
wherein each printed circuit board of the plurality of printed circuit boards comprises a first side and a second side opposite the first side and separated from the first side by a thickness of the respective printed circuit board;
wherein the individual printed circuit boards of the plurality of printed circuit boards are stacked and overlap one another;
a housing portion that is joined with the lens holder to encase the plurality of printed circuit boards;
wherein circuitry disposed at the first printed circuit board is electrically connected with circuitry disposed at the second printed circuit board via board-to-board electrical connection;
wherein the circuitry disposed at the first printed circuit board comprises an imaging sensor, and wherein the imaging sensor is disposed at the first side of the first printed circuit board;
wherein, with the first side of the first printed circuit board and the imaging sensor facing the plurality of lens optics and with the plurality of lens optics aligned with the imaging sensor, the first side of the first printed circuit board is adhesively bonded to the lens holder via cured adhesive;
wherein thermally conductive material is disposed between the second side of the first printed circuit board and the first side of the second printed circuit board, and wherein the thermally conductive material is in thermally-conductive contact with the second side of the first printed circuit board and is in thermally-conductive contact with the first side of the second printed circuit board;
wherein a first electrical connector is disposed at the second side of the second printed circuit board;
wherein the first electrical connector electrically connects with a second electrical connector of an electrical connector portion of the housing portion as the housing portion is being joined with the lens holder to encase the plurality of printed circuit boards during assembly of the vehicular camera;
wherein, with the vehicular camera mounted at a vehicle, the vehicular camera is disposed at an in-cabin side of a windshield of the vehicle and views at least forward of the vehicle through the windshield of the vehicle;
wherein, with the vehicular camera mounted at the vehicle, image data captured by the imaging sensor is communicated via a data communication link to an electronic control unit of the vehicle;
wherein the electronic control unit comprises an image processor for processing image data captured by the imaging sensor; and
wherein, with the vehicular camera mounted at the vehicle, image data captured by the imaging sensor is processed by the image processor for a driving assistance system of the vehicle.

33. The vehicular camera of claim 32, wherein the driving assistance system comprises a headlamp control system.

34. The vehicular camera of claim 32, wherein the driving assistance system comprises a pedestrian detection system.

35. The vehicular camera of claim 32, wherein the driving assistance system comprises a collision avoidance system.

36. The vehicular camera of claim 32, wherein the driving assistance system comprises a lane marker detection system.

37. The vehicular camera of claim 32, wherein the cured adhesive is initially curable in an initial curing process that comprises exposure to UV light, and wherein the initially-cured adhesive is further curable to a further cured strength in a secondary curing process after the plurality of lens optics is aligned with the imaging sensor.

38. The vehicular camera of claim 37, wherein, after the initial curing process, the vehicular camera is moved to the secondary curing process, and wherein, when further cured via the secondary curing process, the further-cured adhesive is sufficiently strong to hold the lens barrel relative to the lens holder for use of the vehicular camera in the vehicle.

39. The vehicular camera of claim 37, wherein the cured adhesive comprises a UV-curable/heat-curable adhesive.

40. The vehicular camera of claim 32, wherein the lens holder comprises a plurality of protrusions, and wherein the cured adhesive comprises a plurality of individual cured adhesive beads, and wherein each individual protrusion of the plurality of protrusions of the lens holder is adhesively bonded to the first side of the first printed circuit board via a respective individual cured adhesive bead.

41. The vehicular camera of claim 40, wherein the board-to-board electrical connection electrically connecting circuitry disposed at the first printed circuit board with circuitry disposed at the second printed circuit board comprises a flexible ribbon cable.

42. The vehicular camera of claim 40, wherein the board-to-board electrical connection electrically connecting circuitry disposed at the first printed circuit board with circuitry disposed at the second printed circuit board comprises a multi-pin connection.

43. The vehicular camera of claim 40, wherein the thermally conductive material comprises a thermally conductive pad.

44. The vehicular camera of claim 40, wherein the thermally conductive material comprises a thermally conductive gel.

45. The vehicular camera of claim 40, wherein the first and second printed circuit boards of the plurality of printed circuit boards are electrically interconnected before the first printed circuit board is adhesively bonded to the plurality of protrusions of the lens holder.

46. The vehicular camera of claim 40, wherein the housing portion is joined with the lens holder after the first printed circuit board is adhesively bonded to the plurality of protrusions of the lens holder.

47. The vehicular camera of claim 32, wherein the thermally conductive material allows for movement of the first and second printed circuit boards of the plurality of printed circuit boards as the housing portion is being joined with the lens holder during assembly of the vehicular camera.

48. The vehicular camera of claim 47, wherein movement allowed by the thermally conductive material facilitates alignment of the first electrical connector with the second electrical connector of the electrical connector portion of the housing portion as the housing portion is being joined with the lens holder during assembly of the vehicular camera.

49. The vehicular camera of claim 47, wherein the thermally conductive material comprises a pliable thermally conductive material.

50. The vehicular camera of claim 47, wherein the thermally conductive material comprises a compressible thermally conductive material.

51. The vehicular camera of claim 47, wherein the thermally conductive material comprises an elastomeric thermally conductive material.

52. The vehicular camera of claim 32, wherein the thermally conductive material comprises a pliable thermally conductive material.

53. The vehicular camera of claim 32, wherein the plurality of lens optics is aligned with the imaging sensor after the first and second printed circuit boards of the plurality of printed circuit boards are electrically interconnected.

54. The vehicular camera of claim 32, wherein with the vehicular camera mounted at the vehicle, the electrical connector portion of the housing portion electrically connects to a wire harness of the vehicle.

55. The vehicular camera of claim 54, wherein the electrical connector portion of the housing portion comprises a coaxial connector.

56. The vehicular camera of claim 54, wherein the electrical connector portion of the housing portion comprises a multi-pin connector.

57. A vehicular camera comprising:
a lens holder comprising a lens barrel accommodating a plurality of lens optics;
a plurality of printed circuit boards, wherein the plurality of printed circuit boards comprises at least a first printed circuit board and a second printed circuit board;
wherein each printed circuit board of the plurality of printed circuit boards comprises a first side and a second side opposite the first side and separated from the first side by a thickness of the respective printed circuit board;
wherein the individual printed circuit boards of the plurality of printed circuit boards are stacked and overlap one another;
a housing portion that is joined with the lens holder to encase the plurality of printed circuit boards;
wherein circuitry disposed at the first printed circuit board is electrically connected with circuitry disposed at the second printed circuit board via board-to-board electrical connection;
wherein the circuitry disposed at the first printed circuit board comprises an imaging sensor, and wherein the imaging sensor is disposed at the first side of the first printed circuit board;
wherein, with the first side of the first printed circuit board and the imaging sensor facing the plurality of lens optics and with the plurality of lens optics aligned with the imaging sensor, the first side of the first printed circuit board is adhesively bonded to the lens holder via cured adhesive;
wherein the cured adhesive comprises a plurality of individual cured adhesive beads;
wherein thermally conductive material is disposed between the second side of the first printed circuit board and the first side of the second printed circuit board, and wherein the thermally conductive material is in thermally-conductive contact with the second side of the first printed circuit board and is in thermally-conductive contact with the first side of the second printed circuit board;
wherein a first electrical connector is disposed at the second side of the second printed circuit board;
wherein the first electrical connector disposed at the second side of the second printed circuit board connects with a second electrical connector of an electrical connector portion of the housing portion as the housing portion is being joined with the lens holder to encase the plurality of printed circuit boards during assembly of the vehicular camera;
wherein, with the vehicular camera mounted at a vehicle, the vehicular camera is disposed at a rear portion of the vehicle and views at least rearward of the vehicle and electrically connects to the vehicle via the electrical connector portion of the housing portion of the vehicular camera; and
wherein image data captured by the imaging sensor is processed by an image processor of the vehicular camera and wherein the circuitry disposed at the second printed circuit board comprises the image processor.

58. The vehicular camera of claim 57, wherein the image processor disposed at the second printed circuit board comprises an image processing chip.

59. The vehicular camera of claim 57, wherein the board-to-board electrical connection electrically connecting circuitry disposed at the first printed circuit board with circuitry disposed at the second printed circuit board comprises a flexible ribbon cable.

60. The vehicular camera of claim 57, wherein the board-to-board electrical connection electrically connecting circuitry disposed at the first printed circuit board with circuitry disposed at the second printed circuit board comprises a multi-pin connection.

61. The vehicular camera of claim 57, wherein the imaging sensor comprises a CMOS imaging sensor and wherein the image processor comprises an image processing chip.

62. The vehicular camera of claim 57, wherein the lens holder comprises a plurality of protrusions, and wherein each individual protrusion of the plurality of protrusions of the lens holder is adhesively bonded to the first side of the first printed circuit board via a respective individual cured adhesive bead.

63. The vehicular camera of claim 62, wherein with the vehicular camera mounted at the vehicle, the electrical connector portion of the housing portion electrically connects to a wire harness of the vehicle.

64. The vehicular camera of claim 63, wherein the electrical connector portion of the housing portion comprises a coaxial connector.

65. The vehicular camera of claim 63, wherein the electrical connector portion of the housing portion comprises a multi-pin connector.

66. The vehicular camera of claim 62, wherein the cured adhesive comprises four individual cured adhesive beads.

67. The vehicular camera of claim 66, wherein the plurality of protrusions of the lens holder comprises four individual protrusions, and wherein each protrusion of the four individual protrusions of the lens holder is adhesively bonded to the first side of the first printed circuit board via a respective individual cured adhesive bead of the four individual cured adhesive beads.

68. The vehicular camera of claim 67, wherein, responsive at least in part to processing by the image processor of image data captured by the imaging sensor of the vehicular camera, a pedestrian present rearward of the vehicle is detected.

69. The vehicular camera of claim 68, wherein, responsive to detection of the pedestrian present rearward of the vehicle is detected, a driver of the vehicle is alerted to presence of the detected pedestrian.

70. The vehicular camera of claim 69, wherein the driver of the vehicle is visually alerted to presence of the detected pedestrian.

71. The vehicular camera of claim 69, wherein the driver of the vehicle is visually alerted to presence of the detected pedestrian via a graphic overlay that overlays video images derived from image data captured by the imaging sensor of the vehicular camera that are displayed at a video display screen of the vehicle viewable by the driver during a reversing maneuver of the vehicle.

72. The vehicular camera of claim 71, wherein the electrical connector portion of the housing portion comprises a multi-pin connector.

73. The vehicular camera of claim 72, wherein the thermally conductive material allows for movement of the first and second printed circuit boards of the plurality of printed circuit boards as the housing portion is being joined with the lens holder during assembly of the vehicular camera.

74. The vehicular camera of claim 73, wherein the imaging sensor comprises a CMOS imaging sensor and wherein the image processor comprises an image processing chip.

75. The vehicular camera of claim 74, wherein the board-to-board electrical connection electrically connecting circuitry disposed at the first printed circuit board with circuitry disposed at the second printed circuit board comprises a flexible ribbon cable.

76. The vehicular camera of claim 74, wherein the board-to-board electrical connection electrically connecting circuitry disposed at the first printed circuit board with circuitry disposed at the second printed circuit board comprises a multi-pin connection.

77. The vehicular camera of claim 67, wherein the cured adhesive is initially curable in an initial curing process that comprises exposure to UV light, and wherein the initially-cured adhesive is further curable to a further cured strength in a secondary curing process after the plurality of lens optics is aligned with the imaging sensor.

78. The vehicular camera of claim 77, wherein, after the initial curing process, the vehicular camera is moved to the secondary curing process, and wherein, when further cured via the secondary curing process, the further-cured adhesive is sufficiently strong to hold the lens barrel relative to the lens holder for use of the vehicular camera in the vehicle.

79. The vehicular camera of claim 77, wherein the cured adhesive comprises a UV-curable/heat-curable adhesive.

80. The vehicular camera of claim 66, wherein the thermally conductive material allows for movement of the first and second printed circuit boards of the plurality of printed circuit boards as the housing portion is being joined with the lens holder during assembly of the vehicular camera.

81. The vehicular camera of claim 80, wherein the first and second printed circuit boards of the plurality of printed circuit boards are electrically interconnected before the first printed circuit board is adhesively bonded to the plurality of protrusions of the lens holder.

82. The vehicular camera of claim 80, wherein the housing portion is joined with the lens holder after the first printed circuit board is adhesively bonded to the plurality of protrusions of the lens holder.

83. The vehicular camera of claim 80, wherein movement allowed by the thermally conductive material facilitates alignment of the first electrical connector with the second electrical connector of the electrical connector portion of the housing portion as the housing portion is being joined with the lens holder during assembly of the vehicular camera.

84. The vehicular camera of claim 80, wherein the imaging sensor comprises a CMOS imaging sensor and wherein the image processor comprises an image processing chip.

85. The vehicular camera of claim 80, wherein the thermally conductive material comprises a pliable thermally conductive material.

86. The vehicular camera of claim 80, wherein the thermally conductive material comprises a compressible thermally conductive material.

87. The vehicular camera of claim 80, wherein the thermally conductive material comprises an elastomeric thermally conductive material.

88. The vehicular camera of claim 57, wherein the plurality of lens optics is aligned with the imaging sensor after the first and second printed circuit boards of the plurality of printed circuit boards are electrically interconnected.

89. The vehicular camera of claim 57, wherein the thermally conductive material comprises a thermally conductive pad.

90. The vehicular camera of claim 57, wherein the thermally conductive material comprises a thermally conductive gel.

* * * * *